June 3, 1930.  L. BLACKMORE  1,761,965
SNUBBER
Filed July 29, 1927
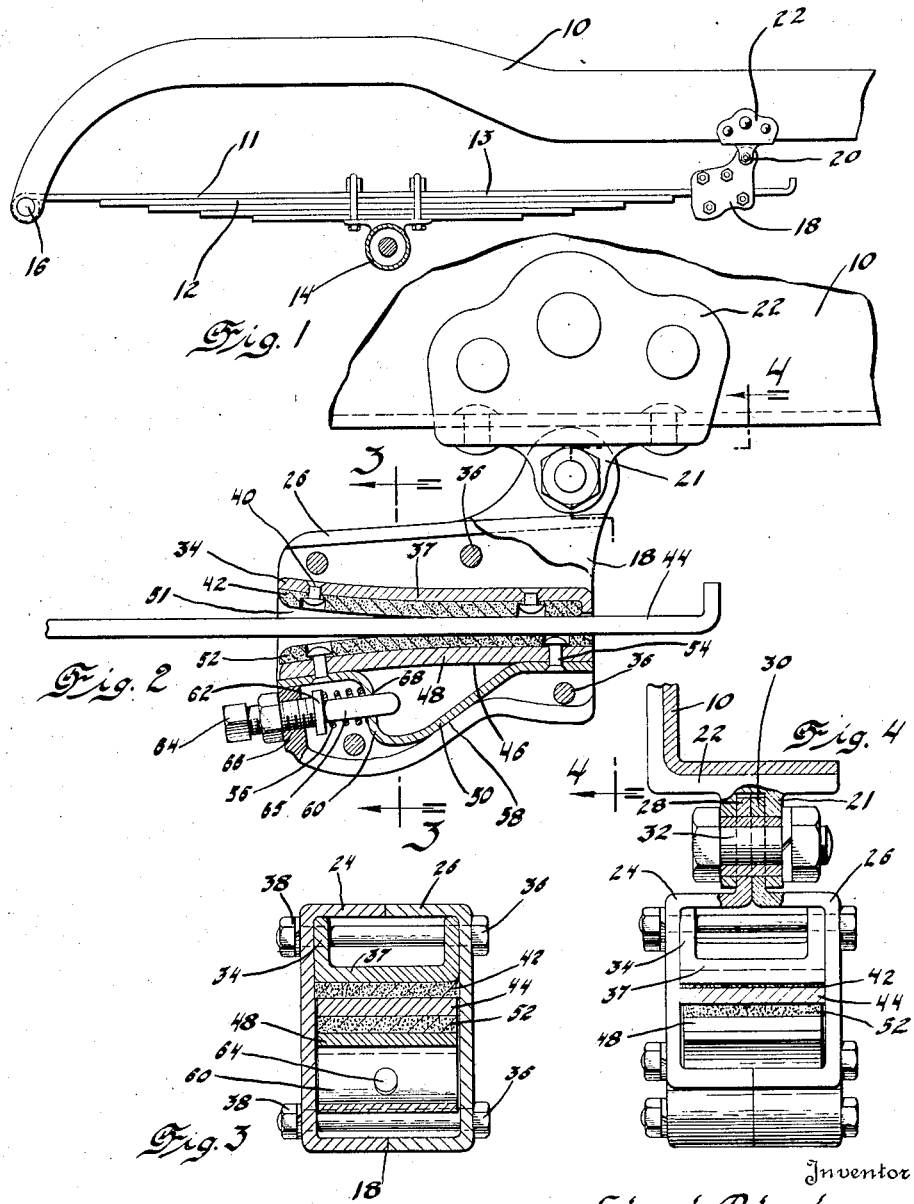
Inventor
Lloyd Blackmore Patented June 3, 1930

1,761,965

UNITED STATES PATENT OFFICE

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE

SNUBBER

Application filed July 29, 1927. Serial No. 209,313.

This invention relates to spring suspensions for vehicles, and has particular reference to a means for absorbing the road shocks.

Prior constructions have usually made use of a separate shock absorbing means which have customarily been placed at the axle between the spring and the frame. It is the purpose of the present invention to incorporate a shock absorber within the spring shackle at one end of the spring and thereby eliminate the usual shock absorber.

To accomplish the object of the invention I make use of a bracket which is pivoted to the vehicle frame and through which there extends one end of the spring. Friction surfaces are built into the bracket above and below the spring and are in direct contact therewith. One of the friction surfaces is stationary, while the second is movable, and the arrangement of these friction surfaces is such that they will allow for a substantially free movement of the spring in one direction and offer substantial opposition to the movement in the opposite direction. The stationary friction surface is fixed to the bracket while the movable one is attached to a member confined within the bracket and capable of movement relative thereto. The bracket and movable member have co-operating cam surfaces which will permit the member to slide over the bracket to permit substantially free movement of the spring in the one direction. A coil spring is arranged between the bracket and movable member, and constantly tends to urge it against the vehicle spring, and as the vehicle spring tends to move in the opposite direction, the two friction surfaces will be urged toward each other and tend to obtain a firmer hold on the spring and resist its movement. The vehicle spring will therefore be forced through the bracket against the resistance of the two friction surfaces, thereby retarding the movement of the spring and preventing violent rebound.

This retarding movement on the rebound will be most effective when the spring flexure is the greatest for the reason that the spring has a toggle-like action as it vibrates or oscillates in its vertical plane. The point of application of the force may be considered as at the axle and when the spring is bowed to its maximum, the arms of the toggle, i. e. the two spring halves at either side of the axle, are more nearly in vertical alignment with the point of force application. In this situation a relatively much greater force is required to return the spring to normal position, for when the spring flexure is small, the toggle arms are almost in alignment and are capable of exerting a relatively greater force at the spring ends. This capability of using the inherent force action of a toggle joint is an essential part of the invention for the reason that it is available when most needed. Thus; when the spring flexure is large, the force applied to force the spring end through the bracket and against the resistance offered by the friction surface will be greater, and longer in action, and necessarily cause a greater and firmer gripping of the spring end between the friction surfaces. The advantage will also be with the friction surfaces because of the extreme position of the toggle arms. The check on the recoil or rebound will therefore be greatest at the position of maximum spring flexure or major deflections, and least with minimum flexure or minor deflections, an accomplishment which is the aim of all shock absorbers. When the spring flexure is small, the friction surfaces offer no essential retarding effect to the spring end because the toggle arms or spring halves are in substantial alignment and capable of exercising a very great force. During small oscillations, therefore, the spring will teeter or oscillate up and down substantially unobstructed, or in the manner of the conventional spring suspension.

The invention is disclosed on the accompanying drawing in which:

Figure 1 shows a side view of a portion of the frame of a vehicle with my invention applied thereto.

Figure 2 is an enlarged longitudinal sectional detail of the novel bracket.

Figures 3 and 4 are sections on the lines 3—3 and 4—4 of Figure 2.

Referring to the numbered parts on the drawing, 10 indicates the frame or chassis of a vehicle, 14 the axle, and 12 the spring comprising the two halves 11 and 13. The spring is pivoted in the usual way at the one end as shown at 16 while the other end is connected to the frame by means of the bracket 18 pivoted at 20 to a second bracket 22 secured to the frame. The pivot 20 may be at the center or either end of the bracket.

The spring 12 in Figure 1 is shown as substantially flat which is its normal condition or the position of laminated springs in use on vehicles of present practice. The halves 11 and 13 are thus free to react to any slight oscillations which will afford even riding over small bumps or ruts in the road, or such unevennesses as are ordinarily met with. However, when passing over relatively deep ruts or large bumps in the road, the spring 12 will be deeply arched which will position the spring halves 11 and 13 more to the vertical so that the return movement of the axle 14 will force the spring end 13 to slide through the bracket 18 and against the pressure of two friction surfaces as will be later described.

The bracket 18 is formed of two complementary halves 24 and 26, each bracket half having eyes 28 and 30 which co-operate with an eye 21 on the bracket 22 to form a pivotal connection as shown at 32.

At the upper portion of the bracket halves there is confined the U-shaped member 34, secured by means of bolts 36 passing through bracket 18. Nuts 38 are applied to the ends of the bolts 36 to hold the parts together.

To the web portion 37 of the U-shaped member 34 there is secured by means of the rivets 40 a suitable friction fabric 42 which engages the upper surface of the spring end 44, which passes through the bracket 18 as is seen from Figure 2.

In the lower portion of the bracket 18 there is mounted the movable member 46 comprising a plate 48 and a cam 50, and attached to the plate 48 by means of the rivets 54 is a second friction fabric 52. These rivets also form the means of connecting the cam 50 to the plate 48. The friction material 52 contacts with the lower side of the spring end 44 and is constantly urged thereagainst by means of the coil spring 56 acting on the cam 50 which co-operates the cam surface 58 on the bracket 18. The spring 56 is confined between a shoulder 60 on the cam 50, and a washer 62 resting on a shoulder formed on a bolt 64 which is threaded into the bracket 18 as shown at 66. The shank 65 of the bolt 64 is of reduced diameter and extends through the coil spring 56, and through an opening 68 in the shoulder 60 of the cam 50 and holds the spring in position.

The base of the U-shaped member 34 and the plate 48 are separated a greater distance at the front end than at the rear end as shown at 51 in Figure 2. The purpose of this construction is to allow for an easy movement of the spring end 44 toward the left or when the vehicle spring 12 is flexing. On the rebound, or when the spring 12 is returning to its normal state, the spring 56 and the cam surfaces 50 and 58 will urge the friction material 52 tighter against the spring 44, causing a firmer grip and a retarding of the return movement or action of the spring and thereby preventing violent rebound. The spacing of the friction members from the spring at the left end of Figure 2 has been somewhat exaggerated for purposes of clearer illustration.

The operation of the construction is as follows: When the vehicle strikes a bump in the road the spring 12 will be flexed or bowed in an upward direction, and will pull the spring end 44 through the bracket 18. The friction surfaces at 42 and 52 will form no serious obstruction to this movement for the reason the member 56 is capable of moving as a whole to the left against the tension of the coil spring 56 as shown at Figure 2. However on the rebound, or as the spring tends to return to the position shown at Figure 1, the coil spring 56 will urge the member 46 and the friction material 52 upwardly and against the spring end 44, causing a firmer grip between the spring and friction surfaces and tend to confine the spring end between the two fabric surfaces 42 and 52. The faster the spring end 44 tends to force its way through the bracket 18, all the more will the friction surfaces of the fabrics 42 and 52 tend to obtain a firmer grip, and resist the passage of the spring through the bracket. This free movement of the vehicle spring in the one direction, and the resistance to its movement on the rebound will prevent violent rebound in accordance with the principles set out in the statement of invention.

The spring 12 is, of course, capable of being flexed to an arched or a bowed position either above or below its normally straight position. The resistance to the return of the spring to normal position is the same whether the spring is arched or bowed above or below its normal position.

I claim:

1. In a shock absorber for vehicles, a normally substantially straight spring pivoted at one end to the vehicle frame and adapted to be flexed to arched or bowed positions at both sides of its normal position, a bracket pivoted to the frame and directly connected to the other end of the spring, and a plurality of friction surfaces in said bracket for retarding return movement of said spring from bowed position on either side of its normal position.

2. In a shock absorber for vehicles, a normally substantially straight spring adapted to be flexed to arched or bowed positions at both sides of its normal position and permanently pivoted at one end to the vehicle, a bracket attached to the vehicle for receiving one end of the spring, a friction material secured to the bracket and engaging the spring, a movable member confined in the bracket, and a friction material secured to the member and bearing on said spring, said friction material resisting return movement of said spring from bowed position on either side of its normal position.

3. In a shock absorber for vehicles, a two part bracket pivoted to the vehicle, a spring having an end passing freely through the bracket, a U-shaped member secured in said bracket, a friction material secured to said member and bearing on said spring, a movable element confined within said bracket, a friction material secured to said element and bearing against said spring, co-operating cam surfaces on said element and bracket, and means tending to urge said element against said spring.

4. The invention of claim 3, said means comprising a resilient member secured between said bracket and movable member.

5. The invention of claim 3, said means comprising a bolt secured in the bracket and passing through an opening in the movable member, and a spring surrounding said bolt and confined between the bracket and movable member.

6. In a spring suspension for vehicles, a flat spring having one end permanently connected and its other end slidably connected to the vehicle frame, means in said slidable connection for retarding rebounds of said spring due to major deflections but offering no substantial resistance to rebounds due to minor deflections.

7. The invention of claim 6, said means comprising a plurality of friction surfaces at said bracket.

8. In a shock absorber for vehicles, a normally substantially straight spring adapted to be flexed to arched or bowed positions at both sides of its normal position and pivoted at one end to the vehicle, a bracket attached to the vehicle for receiving one end of the spring, a friction material secured to the bracket and engaging the spring, a movable member confined in the bracket, a friction material secured to the member and bearing on said spring, said friction material resisting return movement of said spring from bowed position on either side of its normal position, and means for urging said member against said spring.

9. In a shock absorber for vehicles, a normally substantially straight spring adapted to be flexed to arched or bowed positions at both sides of its normal position and pivoted at one end to the vehicle, a bracket attached to the vehicle for receiving one end of the spring, a friction material secured to the bracket and engaging the spring, a movable member confined in the bracket, a friction material secured to the member and bearing on said spring, said friction material resisting return movement of said spring from bowed position on either side of its normal position, and a resilient element for urging said member against said spring.

10. In a shock absorber for vehicles, a normally substantially straight spring adapted to be flexed to arched or bowed positions at both sides of its normal position and pivoted at one end to the vehicle, a bracket attached to the vehicle for receiving one end of the spring, a friction material secured to the bracket and engaging the spring, a movable member confined in the bracket, a friction material secured to the member and bearing on said spring, said friction material resisting return movement of said spring from bowed position on either side of its normal position, and a spring confined between said bracket and member for urging said member toward said spring.

11. In a shock absorber for vehicles, a spring, a bracket attached to the vehicle for receiving one end of the spring, a friction material secured to the bracket and engaging the spring, a movable member confined in the bracket, a friction material secured to the member and bearing on said spring, said friction material resisting movement of said spring in one direction, a cam surface on said bracket, a cooperating cam surface on said member, and means urging said member over said cam surface to cause the friction material to engage the spring.

12. In a shock absorber for vehicles, a spring, a bracket attached to the vehicle for receiving one end of the spring, said bracket comprising two complementary parts having an ear forming a pivotal connection with the vehicle frame, a friction material secured to the bracket and engaging the spring, a movable member confined in the bracket, and a friction material secured to the member and bearing on said spring, said friction material resisting movement of said spring in one direction.

13. In a shock absorber for vehicles, a spring, a bracket comprising two complementary halves attached to the vehicle for receiving one end of the spring, a friction material secured to the bracket and engaging the spring, a U-shaped member secured in said bracket and serving as a backing for said friction material, a movable member confined in the bracket, and a friction material secured to the member and bearing on said spring, said friction material resisting movement of said spring in one direction.

14. In a shock absorber for vehicles, a normally substantially straight spring adapted to be flexed to arched or bowed positions at both sides of its normal position and permanently pivoted at one end to the vehicle, a connection at the other spring end between the spring and vehicle allowing relative movement between the spring and connection in a direction longitudinally of the spring, and means in said connection for resisting return movements of the spring from its bowed positions on either side of its normal position.

15. In a spring suspension for vehicles, a normally substantially straight spring adapted to be flexed to arched or bowed positions at both sides of its normal position and permanently pivoted at one end to the vehicle, and a connection at the other spring end between the spring and vehicle allowing relative movement between the spring and connection in a direction longitudinally of the spring to allow the return of the spring from bowed positions on either side of its normal position.

16. In a shock absorber for vehicles, a spring adapted to be flexed to bowed positions at both sides of its normal position and permanently pivoted at one end to the vehicle, a connection at the other spring end between the spring and vehicle allowing relatively unrestrained movement between the spring and connection in a direction longitudinally of the spring, and means in said connection for resisting return movements of the spring from its bowed positions on either side of its normal position.

In testimony whereof I affix my signature.

LLOYD BLACKMORE.